March 5, 1935. R. U. ADAMS ET AL 1,993,235
SHEARING MACHINE FOR MARBLE MAKING MACHINES OR THE LIKE
Filed Feb. 27, 1933 4 Sheets-Sheet 1

INVENTORS
Russell U. Adams,
Clyde Hibbs,
BY Frederick Breitenfeld
ATTORNEY

March 5, 1935.    R. U. ADAMS ET AL    1,993,235
SHEARING MACHINE FOR MARBLE MAKING MACHINES OR THE LIKE
Filed Feb. 27, 1933    4 Sheets-Sheet 2
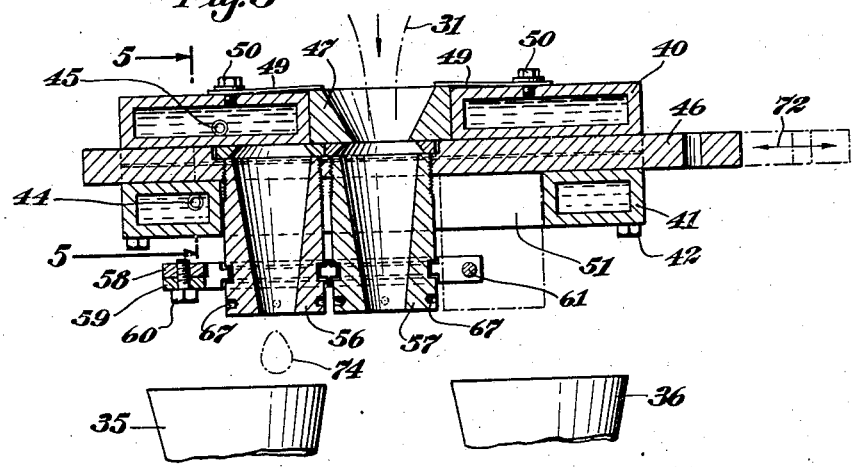
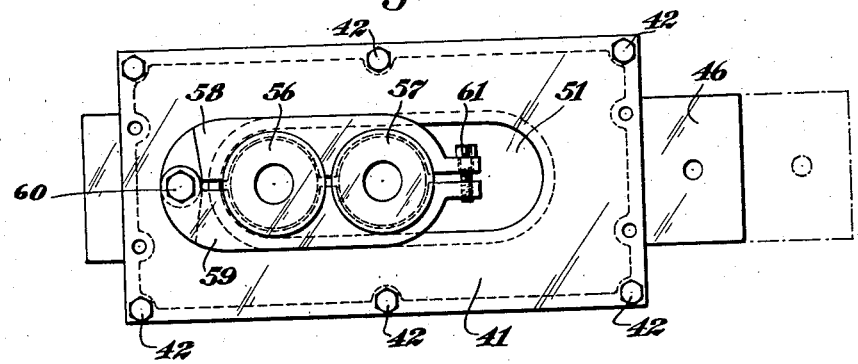
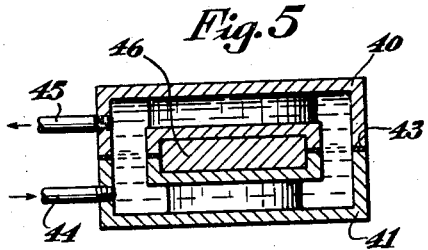
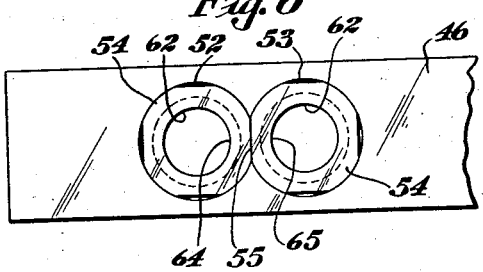
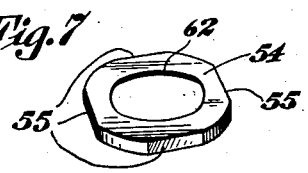
INVENTORS
Russell U. Adams,
Clyde Hibbs,
BY
ATTORNEY

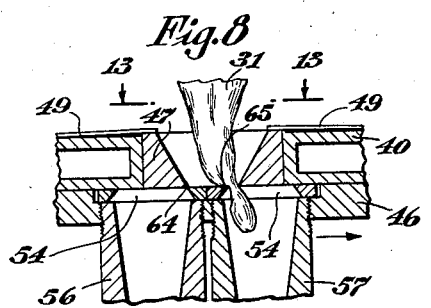
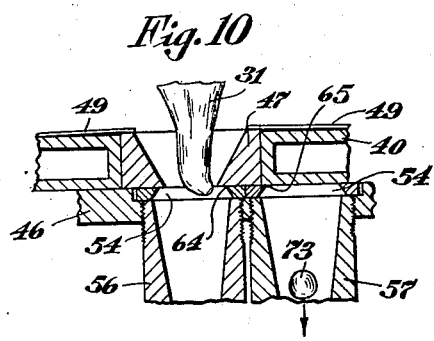
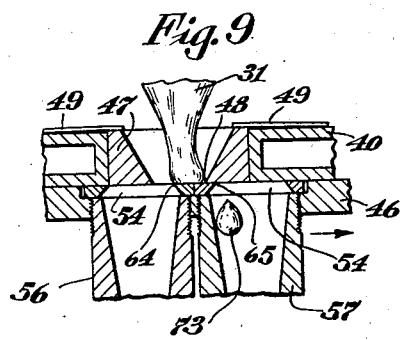
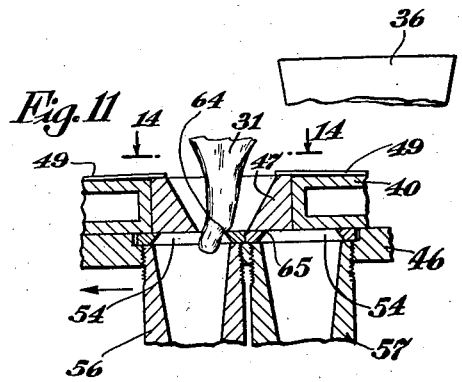
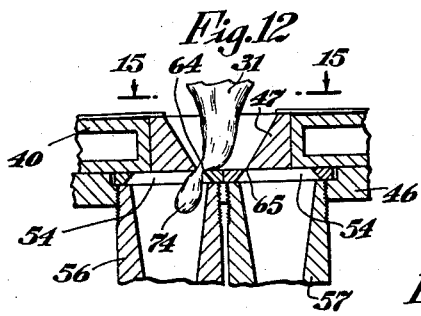
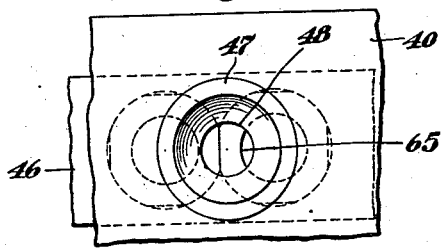
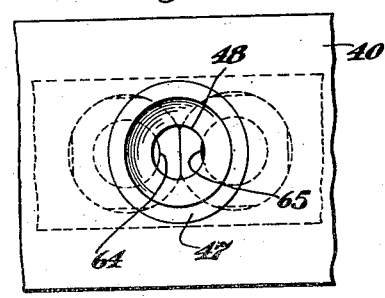
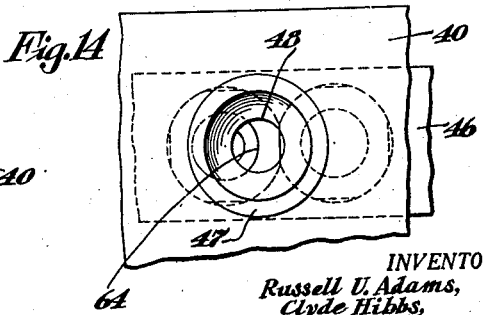

March 5, 1935.  R. U. ADAMS ET AL  1,993,235
SHEARING MACHINE FOR MARBLE MAKING MACHINES OR THE LIKE
Filed Feb. 27, 1933  4 Sheets-Sheet 4
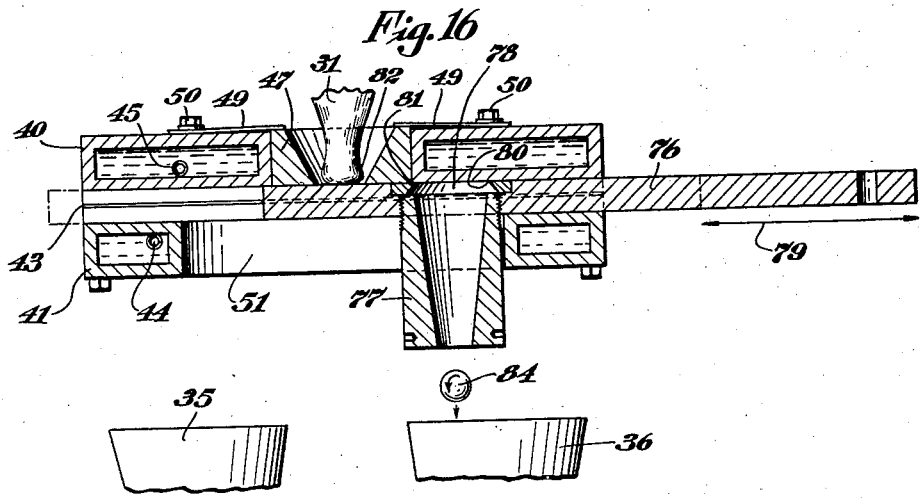
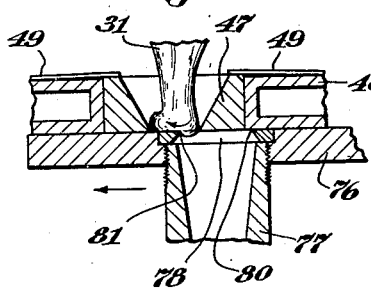
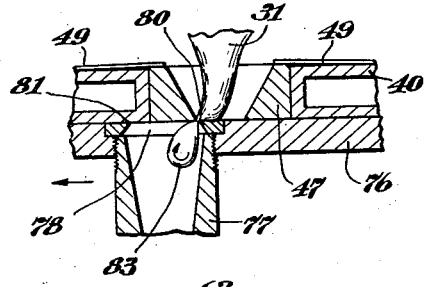
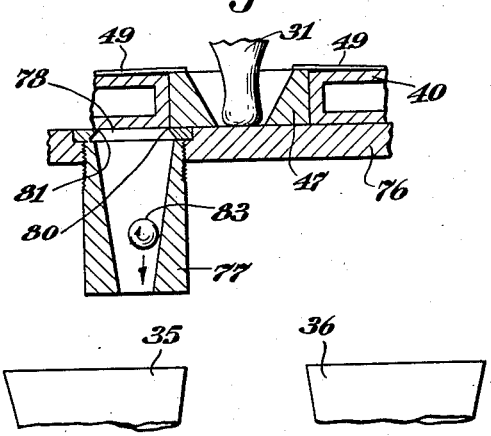
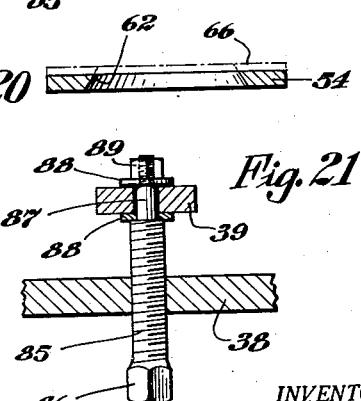
INVENTORS
Russell U. Adams,
Clyde Hibbs,
BY Frederick Breitenfeld
ATTORNEY Patented Mar. 5, 1935

1,993,235

UNITED STATES PATENT OFFICE 1,993,235

SHEARING MACHINE FOR MARBLE MAKING MACHINES OR THE LIKE

Russell U. Adams and Clyde Hibbs, Sistersville, W. Va., assignors to The Lawrence Glass Novelty Co., Sistersville, W. Va., a corporation of West Virginia Application February 27, 1933, Serial No. 658,752

11 Claims. (Cl. 49—14)

Our present invention relates generally to the art of making glass articles, and has particular reference to a new and improved type of shearing device for severing gobs from a stream of molten glass.

While our invention is primarily designed for use in connection with an apparatus for making toy glass marbles, wherein the present shearing device is cooperatively associated with a suitable glass furnace, and with a pair of marble rolling machines, a number of phases of our invention are not necessarily restricted to this specific use, as will be more fully pointed out hereinafter.

A general object of our invention is to provide a shearing device of improved capabilities, and, more particularly, a shearing device which serves not only the normal and obvious function of severing gobs of glass, but also the function of directing the gobs in predetermined different directions. The present shearing device is also of a character which permits it to be used, at will, and by means of a very slight and minor adjustment, for the purpose of imparting a predetermined sort of twirl or swirl to each gob that is severed thereby. Thus, where the invention is employed in the manufacture of vari-colored glass marbles, the present shearing device may be employed to great advantage in imparting a novel and unique appearance to the resultant marbles.

Another general object of our invention is to provide a shearing device which, though simple and inexpensive in structural and operative nature, is nevertheless capable of severing gobs at a greatly increased rate of speed from a continuous stream of molten or plastic glass.

From a specific aspect, it is an important general object of our invention to provide an apparatus for the formation and manufacture of toy glass marbles, wherein a single suitable glass furnace is cooperably and conjointly employed with a pair of marble rolling machines, and with a shearing device of the present character and capability. One of the features of an assembly of this character, resulting directly from the novel characteristics of our present improved shearing device, lies in the ease and simplicity with which the shearing device itself is enabled to direct successive gobs, in alternation, in predetermined different discharge directions leading the gobs, alternately, to one or the other of the marble rolling machines.

A more specific object of our invention is to provide a shearing device in which the cutting instrumentalities are so constructed and arranged, and so supported, that a much greater period of useful operation is rendered possible.

Briefly, our present shearing device may be said to consist of a fixed shear member and a complementary reciprocable shear member, the former being provided with an aperture through which a stream of glass continuously travels, and the latter being provided with two operative cutting edges arranged in such a manner that they are alternately brought into operative shearing relation with opposite edges of said aperture, respectively.

A particular feature of our invention lies in the provision of two independent shear members adapted to be used, selectively, as the complementary reciprocable member of the shearing device. One of the shear members which is thus available for use, at the option of the user, is provided with a pair of openings so arranged that the opposite edges of the bridge between them are adapted to serve as cutting edges; the other member is provided with a single opening constructed and arranged to permit opposite edges to be employed as cutting edges. In accordance with our present invention, each of these members may be detachably mounted in cooperative association with the fixed shear member and with a means for reciprocating the complementary shear member; and the reciprocating instrumentality is adapted to be adjusted to vary its speed and stroke in accordance with the particular shear member that has been chosen.

Another feature of our invention lies in a construction whereby the entire shearing device may be bodily adjusted, in a simple and expeditious manner, with respect to its positional location between the glass furnace outlet and the marble rolling machines to which the separate gobs are to be fed. This adjustability permits the entire apparatus to be operated at maximum efficiency under varying conditions of glass fluidity or heat.

Other objects and features of our invention reside in the general arrangement and construction of parts whereby an extremely simple and inexpensive, yet highly efficient and commercially feasible, device and apparatus are provided.

We achieve the foregoing objects, and such other objects as may hereinafter appear or be pointed out, in the manner illustratively exemplified in the accompanying drawings, wherein—

Figure 3 is a cross-sectional view taken substantially along the line 3—3 of Figure 2;

Figure 4 is a bottom view of the parts shown in Figure 2;

Figure 5 is a cross-sectional view taken substantially along the line 5—5 of Figure 3;

Figure 6 is a fragmentary plan view of one of the reciprocable shear members;

Figure 7 is a perspective view of one of the removable cutting rings shown in Figure 6;

Figure 8 is a fragmentary cross-sectional view taken substantially in the direction of Figure 3, showing one step in the severance of a gob;

Figure 1:
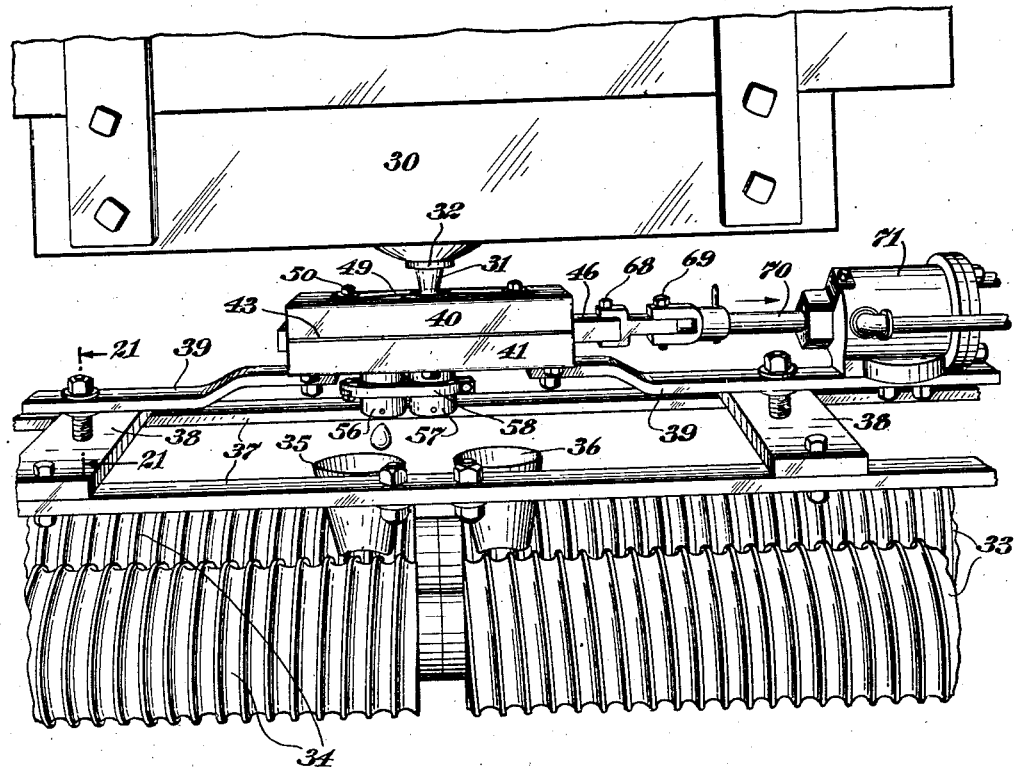
Figure 1 is a front view, in perspective, of an apparatus embodying the features of our present invention.
Figure 2:
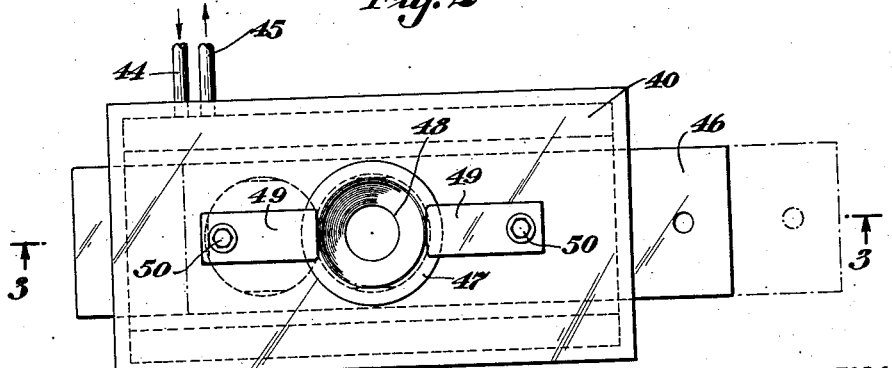
Figure 2 is a plan view of certain parts of the shearing device itself.

Figures 9, 10, 11, and 12 are views similar to Figure 8, showing, respectively, successive steps in the severance of gobs;

Figure 13 is a fragmentary plan view taken substantially along the line 13—13 of Figure 8;

Figures 14 and 15 are views similar to Figure 13 taken substantially along the lines 14—14 and 15—15 of Figures 11 and 12, respectively;

Figure 16 is a view similar to Figure 3, showing the manner of using the alternate reciprocable shear member;

Figures 17, 18, and 19 are fragmentary cross-sectional views similar to Figure 16, showing successive steps in the severance of gobs by means of the shear member of Figure 16;

Figure 20 is a cross-sectional view through a cutting ring of the character shown in Figure 7;

Figure 21 is a fragmentary cross-sectional view taken substantially along the line 21—21 of Figure 1.

In Figure 1, the reference numeral 30 designates a suitable glass furnace within which glass of one or more colors is adapted to be melted, the resultant stream 31 being designed to emanate downwardly, by gravity, through the outlet 32. Beneath this furnace, with their receiving ends arranged closely adjacent to each other, are the marble rolling machines 33 and 34. Each of these machines is of well known character in the art, being composed of a pair of helically grooved complementary rollers. The two rollers of each machine rotate in the same direction, and a gob of plastic glass deposited at the rear or receiving end, is continuously twirled and kneaded, and at the same time longitudinally conveyed, so that by the time it reaches the discharge end of the marble rolling machine it is perfectly spherical, hardened, and ready for use, subject only to cooling. Immediately above the receiving end of each of the marble rolling machines is the usual fixed funnel which is preferably employed for the purpose of facilitating the proper reception, by each marble rolling machine, of each successive plastic gob that is fed thereto. The funnel 35 is shown in fixed relation to the receiving end of the marble rolling machine 34, and the funnel 36 is similarly arranged with respect to the machine 33.

Between the machines 33—34, and the outlet opening 32, we mount the present improved shearing device, which will presently be described in greater detail. In accordance with our present invention, this device is mounted upon the framework 37 forming part of the machines 33 and 34. More particularly, it is to be noted that this framework includes the transverse members 38, and that the shearing device is mounted upon these members by means of the brackets or arms 39.

The present shearing device is illustrated most clearly in Figures 2, 3, 4, and 5. It consists essentially of a fixed, hollow housing composed of an upper section 40 and a lower section 41. These two sections are held together by means of the bolts 42, and a suitable gasket 43 is arranged between the sections. The housing is constructed in this hollow manner for the purpose of permitting a cooling liquid to circulate therein; and for this purpose an inlet 44 is provided in the lower section 41 and an outlet 45 is provided in the upper section 40.

The housing is constructed with a longitudinal, substantially rectangular passage extending therethrough, this passage being adapted to accommodate, in a substantially snug yet slidable manner, a reciprocable bar 46. This bar forms part of the complementary reciprocable shearing member hereinbefore referred to.

The upper section 40 of the housing is provided with an opening adapted to removably receive the cup-shaped element 47, the latter having a downwardly tapered bore terminating at its lower end in an aperture 48 which opens onto the rectangular channel in which the bar 46 reciprocates. The element 47 is preferably held in position by means of the clips 49, each of these being pivotally secured to the section 40 by means of the studs 50.

The lower section 41 is provided with a substantially elongated opening 51.

The bar 46 is provided on its upper face with the two substantially circular recesses 52 and 53 (Figure 6). These recesses merge with each other, and each one is adapted to receive a cutting ring 54 of the character most clearly illustrated in Figures 7 and 20. Each of the cutting rings is provided with flattened peripheral faces 55, so that when the rings are in position in the recesses 52 and 53 the contiguous flattened faces will abut, thereby mutually locking the rings against rotation.

Under the recesses 52 and 53 we provide threaded bores adapted to receive the upper threaded ends of the guide tubes 56 and 57. Each of the latter has a downwardly tapering passage, as shown, and these tubes are rigidified, relative to each other, by means of a yoke engaging them near their lower ends. This yoke may consist of the two complementary jaws 58 and 59, pivotally secured together as at 60 and adapted to be tightened into closed relationship by means of the element 61 engaging the free ends. The elements 58 and 59 are provided with openings through which the tubes 56 and 57 extend, and the tubes are provided with annular grooves which accommodate corresponding annular ridges provided on the elements 58 and 59.

The tubes 56 and 57 extend downwardly through the opening 51 previously referred to; and being carried by the bar 46 they reciprocate and move along with the bar 46, traveling from the full-line position of Figure 3 to the dot-and-dash position indicated in that figure.

Each of the cutting rings 54 is provided with an upwardly tapering, inner wall terminating in the upper, circular opening 62. These rings are adapted to rest on the upper edges of the guide tubes so that the upper faces of the rings are flush with the upper face of the bar 46. The upper, attenuated edge 62 of each ring is adapted to serve as a cutting edge. However, only a portion of each cutting edge is operative at any given time. For example, when the rings are arranged as in Figure 6 only the portions 64 and 65 of the cutting edges 62 are operative. It will be noted that the cutting edges 64 and 65 are arranged along the opposite edges of the bridge which separates the two openings in the bar 46.

When the operative edges 64 and 65 need replacement, they are shifted in a direction which is longitudinal with respect to the bridge referred to so as to bring other portions of the edges 62 into operative positions. This is accomplished by lifting either of the cutting rings out of its recess, and setting it back into the recess after turning it through a sufficient angle to bring another of the flattened faces 55 into abutting relationship to the contiguous abutting face of the other ring.

When the entire cutting edge of either ring needs resharpening, the entire outer surface of the ring is ground, as indicated in Figure 20, wherein the dot-and-dash line 66 may be deemed to represent the outer edge, before grinding. This, of course, makes the cutting ring thinner, but it accomplishes the desired object of attenuating and sharpening the upper operative cutting edge 62. For the purpose of reestablishing the flush relationship between the upper face and the upper surface of the bar 46, the corresponding guide tube serves as a convenient adjustable support which may be screwed upwardly by a slight degree, whereby the ring which rests on the upper end of the guide tube may be forced upwardly by the proper amount so as to reestablish the flush relationship in question. The rotative adjustability of the guide tubes 56 and 57 may be accomplished by any suitable means, and we have illustratively shown openings 67 which permit a suitable tool to be inserted for this purpose.

In a similar manner, the cup-shaped element 47 may be sharpened or attenuated by grinding its lower surfaces, and the clips 49 yieldably press the element 47 into its proper position after the grinding has been accomplished.

The shearing device operates by reciprocation of the bar 46, and this we accomplish by articulating one end of the bar, as at 68 and 69, to the piston rod 70 of a suitable work cylinder 71 which may operate by air or steam or any other suitable means. This cylinder is supported upon one of the arms 39, as indicated most clearly in Figure 1.

Where the two-hole bar 46 is employed, the parts are arranged in such a manner that the reciprocation will have an amplitude substantially equal to that represented by the double-headed arrow 72 of Figure 3.

The operation is most clearly illustrated in Figures 3 and 8–15.

The stream 31 travels continuously through the aperture 48 of the fixed shear member constituted of the element 47. When the bar 46 is at the extreme left end of its stroke, the parts are in the relationship of Figure 3, and it is to be noted that the right-hand opening is aligned with the aperture 48. As the bar 46 starts to travel toward the right, the operative cutting edge 65 impinges upon the stream 31, as indicated in Figure 8. Presently, the edge 65 comes into shearing relationship with the right-hand edge of the aperture 48, thereby causing the gob 73 to be severed from the stream 31. This is illustrated in Figure 9. By virtue of the rapid travel of the bar 46, the gob 73 is discharged in a right-hand direction. The fact that the gob 73 travels downwardly through the tube 57, and the fact that this tube is moving with the bar 46, results in guiding the gob further in this right-hand direction, so that when the bar 46 reaches the extreme opposite end of its stroke the gob 73 is discharged downwardly into the funnel 36, as indicated in Figure 10.

In the meantime, the other opening in the bar 46 has come into registry with the aperture 48, as indicated in Figure 10, and the stream 31 starts to travel downwardly through this opening. Presently it is impinged, however, by the returning bar 46, and, more particularly, by the operative cutting edge 64, as indicated in Figure 11. The further leftward movement of the bar 46 ultimately brings the edge 64 into shearing relationship with the left-hand edge of the aperture 48, as indicated in Figure 12, so that another gob, 74, is severed from the stream 31. This gob, by virtue of the leftward movement of the bar, is discharged in a leftward direction, and the continued leftward movement of the guide tube 56 guides the gob further toward the left, so that when the bar 46 reaches its extreme left-hand position, the gob 74 is discharged, as indicated in Figure 3, into the funnel 35.

The speed of reciprocation is, of course, controlled in accordance with the fluidity or sluggishness of the stream 31 and in accordance with the size of gob desired. The operation above described is repeated during each stroke of the bar 46, and as a result this bar is operative during both its movements, severing and discharging a gob first in one direction and then in the opposite direction. As each gob is severed, it starts to travel in one or the other direction, depending upon whether it has been cut by the edge 64 or the edge 65, and the corresponding guide tube proceeds to guide each gob further in the particular direction in which it has been started.

To accomplish a unique striping effect, where the stream 31 is composed of flowing glass of two or more colors, the bar 46 is removed from association with the shearing device, and the bar 76 is inserted in its place. This substitution is accomplished by disconnecting the element 68, and by unscrewing the guide tubes 56 and 57 from the bar 46. The bar 76 is then inserted, the connection 68 is reestablished, and the single guide tube 77 (with which the bar 76 is provided) is screwed into position.

The bar 76 is provided with only a single opening, as distinguished from the two openings arranged side by side in the bar 46. The tube 77 screws into the lower portion of this hole and supports, at its upper edge, a cutting ring 78. This ring is constructed in the same manner as the rings 54 previously described, and has an upwardly tapered opening terminating in a cutting edge. When the ring is in position, only the opposite portions of this edge are operative.

The shearing device operates in substantially the same way when the bar 76 is used, except that the stroke, and preferably the speed of the bar, are altered. The stroke is modified to double its normal extent, as indicated by the double-headed arrow 79 of Figure 16. The reason for this is because the right-hand edge 80 of the cutting ring cooperates with the left-hand edge of the element 47, and the left edge 81 of the cutting ring cooperates with the right-hand edge of the element 47.

The unique capabilities of the shearing device, with the bar 76, and the added advantages which are achieved by using this bar in place of the bar 46, are most clearly illustrated in Figures 16–19.

In Figure 16, the bar 76 is at the extreme right-hand end of its stroke. By virtue of the absence of the second hole, the stream 31 accumulates, as at 82, on the top surface of the bar 76, to the left of the opening. As the bar 76 is moved toward the left, the friction between the upper surface of the bar and the mass of accumulating glass causes the latter to swirl slightly in the direction of the arrow of Figure 17. When the bar 76 reaches approximately the position of Figure 17, the glass begins to travel downwardly through the opening which is produced, and the mass of accumulated glass has already been swirled to an extent sufficient to produce one or more stripes of the vari-colored glasses entering into the stream.

The further travel of the bar 76 permits the entire mass to drop downwardly; and presently the edge 80 of the cutting ring impinges upon the stream of glass above the swirled accumulated mass, as indicated in Figure 18. When this edge 80 comes into shearing relationship with the left edge of the element 47, a gob is severed as indicated in Figures 18 and 19, and the swirling gob is discharged in a leftward direction. The continued movement of the bar 76, and with it the guide tube 77, carries the severed gob 83 further toward the left, so that it is ultimately discharged into the funnel 35.

Immediately after the shearing has been accomplished, as indicated in Figure 19, the stream 31 again begins to accumulate on the surface of the bar 76, and this time the accumulation occurs to the right of the opening in the bar. When the bar 76 starts to move on the return stroke, to the right, it twirls the accumulated mass in the opposite direction, which will in this case be counterclockwise; and the next twirling gob will be severed when the edge 81 of the cutting ring comes into shearing relationship with the right-hand edge of the element 47. The continuing movement toward the right will carry the gob still further along its direction of discharge, and ultimately this gob (84) will be discharged into the funnel 36, as indicated in Figure 16.

In brief, the employment of the shearing device with the bar 76 may be said to provide for an accumulation, on the slidable bar 76, of the glass during each shearing operation, and for a twirling of the accumulated mass, by the bar 76, between shearing operations.

The manner in which the stroke of the cylinder 71 is reduced, when the bar 46 is employed, is a matter of choice; but we prefer to provide for the reduction of stroke by adjusting a screw in the rear end of the cylinder, for the purpose of taking up some of the stroke at that end, and by adding a washer at the front end of the cylinder, for the purpose of taking up some of the opposite end of the stroke.

In accordance with one of the features of our invention, the entire shearing device, together with its associated parts, is mounted in a manner whereby it may be easily and rapidly adjusted relative to the other portions of the entire apparatus. This we accomplish as indicated in Figure 21, in which it is to be noted that a threaded element 85 is mounted in threaded relationship within each of the transverse frame members 38. At its lower end, the element 85 is provided with the squared portion 86 adapted to receive a suitable tool to effect a turning of the screw. At its upper end, the element 85 is provided with the attenuated, unthreaded portion 87 which fits loosely and rotatably through an opening in the corresponding frame element 39. Washers 88 are preferably provided on opposite sides of the element 39, and a nut 89 may be employed to hold the parts together.

By adjusting the screws 85, the entire shearing device and all its associated parts may be adjusted upwardly or downwardly with respect to the outlet 32. This is advantageous to compensate for varying conditions of the molten glass arising from differences in temperature. For example, when the glass is running hot, it is sometimes desirable to raise the shearing device to avoid impairment of effect due to stringiness of stream.

The adjustable mounting of the shearing device is of further advantage in that it permits the cutters to be renewed or adjusted, and it permits the bars 46 and 76 to be interchangeably inserted by simply withdrawing one of the elements 39 from its corresponding screw 85 and swinging the entire shearing device outwardly from under the orifice 32.

The vertical adjustability of the shearing device is of further advantage and utility in that the length of gob to be cut may thus be adjusted. When the shearing device is raised, a relatively smaller length of stream positions itself in readiness for shearing, between shearing operations; and when the shearing device is lowered, a relatively longer gob may be severed.

It will thus be seen that we have provided a shearing device of novel and advantageous characteristics and capabilities, whereby a marble making apparatus may be operated at greatly increased speed and efficiency, whereby there is a minimum of lost motion and corresponding lost time and output, and whereby the conditions of the glass may be compensated for in a simple manner so that the continued efficient operation of the apparatus need not be impaired. Furthermore, by the ability to employ, at will, either the reciprocable shear member 46, or the corresponding member 76, marbles of differing characteristics may be produced. The use of the bar 46 produces marbles in which a blotch of distinguishing color appears on a mass of so-called "body glass." The use of the bar 76, on the other hand, produces a novel striped effect which has heretofore been capable of accomplishment only by entirely different and more expensive means.

It is to be particularly noted that the two marble rolling machines, and their associated parts, are not in the least modified or altered, nor is the furnace 30 necessarily modified in any respect, to permit the employment of the present shearing device. In other words, it is the present shearing device which itself produces not only a severance of gobs from the stream of glass, but also a successive severance in opposite discharge directions; and it is the shearing device itself which permits the resultant gobs to be of varying characteristics, so far as color merging and arrangement are concerned.

It will be understood that changes in the details herein described and illustrated for the purpose of explaining the nature of our invention may be made by those skilled in the art without departing from the spirit and scope of the invention as expressed in the appended claims. It is therefore intended that these details be interpreted as illustrative, and not in a limiting sense.

Having thus described our invention, and illustrated its use, what we claim as new and desire to secure by Letters Patent is—

1. A shearing device for cutting gobs from a falling stream of molten glass and discharging them alternately along two different directions, comprising a fixed shear member having an aperture through which said stream continuously travels, a double-edged complementary shear member slidably mounted beneath said aperture, a removable cutting element mounted on each of the opposite edges of said slidable member, means for reciprocating said slidable member to bring said elements successively into shearing relation with opposite edges of said aperture, respectively, and means for shifting each of said cutting elements to effect renewal of the operative portion thereof.

2. A shearing device for cutting gobs from a falling stream of molten glass and discharging them alternately along two different directions, comprising a fixed shear member having an aperture through which said stream continuously travels, a complementary shear member slidably mounted beneath said fixed shear member and having two spaced openings, a removable cutting ring mounted in each of said openings, means for reciprocating said slidable member to bring said openings alternately into registry with said aperture, whereby the opposite edges of the bridge between said openings will be brought successively into shearing relation with opposite edges of said aperture, respectively, and means for rotatively shifting each of said cutting rings to effect renewal of the operative portion thereof.

3. A shearing device for cutting gobs from a falling stream of molten glass and discharging them alternately along two different directions, comprising a fixed shear member having an aperture through which said stream continuously travels, a complementary shear member slidably mounted beneath said fixed shear member and having two spaced openings, a removable cutting ring mounted in each of said openings and having a periphery with flattened faces, means for reciprocating said slidable member to bring said openings alternately into registry with said aperture, whereby the opposite edges of the bridge between said openings will be brought successively into shearing relation with opposite edges of said aperture, respectively, and means for rotatively shifting each of said cutting rings to effect renewal of the operative portion thereof, said openings being arranged to permit the contiguous faces of said rings to abut.

4. In a shearing device of the character described, a shear member having a pair of adjacent circular openings therethrough, and a removable cutting ring mounted in each opening, each ring having an outer periphery with flattened faces and said member having circular recesses into which said rings fit, said recesses merging so that the contiguous flattened faces of said rings may abut, whereby the rings will mutually lock each other against rotation.

5. A shearing device for cutting gobs from a falling stream of molten glass and discharging them alternately along two different directions, comprising a fixed shear member having an aperture through which said stream continuously travels, a complementary shear member slidably mounted beneath said fixed shear member and having two spaced openings, means for reciprocating said slidable member to bring said openings alternately into registry with said aperture, whereby the opposite edges of the bridge between said openings will be brought successively into shearing relation with opposite edges of said aperture, respectively, and a pair of discharge tubes aligned with said openings and carried by and movable with said slidable member, said tubes merging at the top with the margins of said openings, respectively, so as to receive the severed gobs and guide them further along their respective directions of discharge.

6. A shearing device for cutting gobs from a falling stream of molten glass and discharging them alternately along two different directions, comprising a fixed shear member having an aperture through which said stream continuously travels, a complementary shear member slidably mounted beneath said fixed shear member and having a single opening therethrough, means for reciprocating said slidable member to bring the opposite edges of said opening successively into shearing relation with opposite edges of said aperture, respectively, whereby said stream accumulates on said slidable member during each shearing operation and is twirled by said member between shearing operations, and a discharge tube carried by and movable with said slidable member, said tube being aligned with said opening so as to receive each twirled and severed gob and guide it further along its direction of discharge.

7. A shearing device for cutting gobs from a falling stream of molten glass and discharging them alternately along two different directions, comprising a fixed shear member having an aperture through which said stream continuously travels, a complementary shear member having a single opening whose opposite edges are adapted to serve as cutting edges, a second complementary shear member having a pair of adjacent openings, the opposite edges of the bridge between said openings being adapted to serve as cutting edges, means for selectively mounting either of said complementary shear members in slidable relation beneath said aperture, and means removably attachable to the selected slidable member for reciprocating the latter.

8. A shearing member of the character described, comprising a bar with a transverse opening therethrough, a cutting ring mounted in one end of the opening with its outer face flush with the face of said bar, and adjustable means for supporting said ring from underneath so as to permit said flush relationship to be maintained when the outer face of the ring is ground.

9. A shearing member of the character described, comprising a bar with a transverse opening therethrough, a cutting ring mounted in one end of the opening with its outer face flush with the face of said bar, a discharge tube mounted in the opposite end of the opening and aligned with said opening, and means for axially adjusting said tube so as to force its inner end into engagement with the under-surface of said ring, whereby said flush relationship may be maintained by adjustment of said tube, when the outer face of the ring is ground.

10. In a marble making apparatus, a furnace adapted to discharge a falling stream of molten glass, a pair of marble rolling machines beneath said furnace and including a supporting frame, a shearing device mounted on said frame for severing gobs from said stream and directing them alternately to the receiving ends of said marble rolling machines, and means for adjusting said shearing device bodily in a substantially vertical direction.

11. In a marble making apparatus, a furnace adapted to discharge a falling stream of molten glass, a pair of marble rolling machines beneath said furnace and including a supporting frame, a shearing device mounted on said frame for severing gobs from said stream and directing them alternately to the receiving ends of said marble rolling machines, and means for adjusting said shearing device bodily in a substantially vertical direction; said last-named means comprising an element in screw-threaded engagement with said frame and engaging with said shearing device.

RUSSELL U. ADAMS.
CLYDE HIBBS.